(12) United States Patent
Moffitt

(10) Patent No.: US 6,228,446 B1
(45) Date of Patent: May 8, 2001

(54) PROTECTIVE FOAMED PATCH FOR SHRINKABLE BAG

(75) Inventor: Ronald Dean Moffitt, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/180,521

(22) Filed: Jan. 12, 1994

Related U.S. Application Data

(63) Continuation of application No. 07/694,710, filed on May 2, 1991, now abandoned.

(51) Int. Cl.[7] .................................................. B65B 53/00
(52) U.S. Cl. ...................... 428/34.9; 428/35.1; 428/36.5; 428/318.8; 428/319.7; 428/319.9
(58) Field of Search ................... 428/35.1, 34.9, 428/36.5, 318.8, 319.7, 319.9

(56) References Cited

U.S. PATENT DOCUMENTS

| | | | |
|---|---|---|---|
| 2,891,870 | 6/1959 | Selby et al. ............................. | 99/174 |
| 3,741,253 | 6/1973 | Brax et al. ............................ | 138/137 |
| 4,049,147 | * 9/1977 | Stiles et al. ........................ | 428/319.9 |
| 4,112,181 | 9/1978 | Baird, Jr. et al. .................... | 428/336 |
| 4,136,203 | * 1/1979 | Murphy et al. ..................... | 428/319.9 |
| 4,267,960 | 5/1981 | Lind et al. ............................ | 229/55 |
| 4,399,180 | 8/1983 | Briggs et al. ........................ | 428/212 |
| 4,425,268 | 1/1984 | Cooper ................................. | 524/110 |
| 4,448,792 | 5/1984 | Schirmer .............................. | 426/113 |
| 4,456,646 | 6/1984 | Nishimoto et al. .................. | 428/216 |
| 4,457,960 | 7/1984 | Newsome ............................. | 428/35 |
| 4,534,984 | 8/1985 | Kuehne ................................ | 426/412 |
| 4,542,075 | 9/1985 | Schirmer ............................. | 428/516 |
| 4,547,427 | 10/1985 | Engelsberger ...................... | 428/349 |
| 4,601,930 | 7/1986 | Engelsberger ...................... | 428/516 |
| 4,657,811 | * 4/1987 | Boyd et al. ........................ | 428/319.9 |
| 4,755,403 | 7/1988 | Ferguson ............................. | 428/35 |
| 4,765,857 | 8/1988 | Ferguson ............................. | 156/229 |
| 4,770,731 | 9/1988 | Ferguson ............................. | 156/229 |
| 4,971,845 | 11/1990 | Aaker et al. ......................... | 428/34 |

FOREIGN PATENT DOCUMENTS

| | | |
|---|---|---|
| 11228/88 | 8/1988 | (AU) . |
| 982923 | 2/1976 | (CA) . |
| 2062417 | 6/1972 | (DE) . |

OTHER PUBLICATIONS

"Foam Concentrates" (Ampacet Product Information Brochure), Jul. 1988, pp. 1–4.*

* cited by examiner

Primary Examiner—Rena L. Dye
(74) Attorney, Agent, or Firm—Mark B. Quatt

(57) ABSTRACT

Disclosed is a protective foamed patch for a biaxially heat shrinkable, thermoplastic vacuum bag for protecting the bag from puncture by sharp protruding bones in the bone-in cuts of meat which are vacuum packaged within the bags. The patch is made from multi-layer film and comprises a layer of foamed polymer. The patch is biaxially heat shrinkable and shrinks with the bag. A method of making the patch is also disclosed.

7 Claims, 4 Drawing Sheets

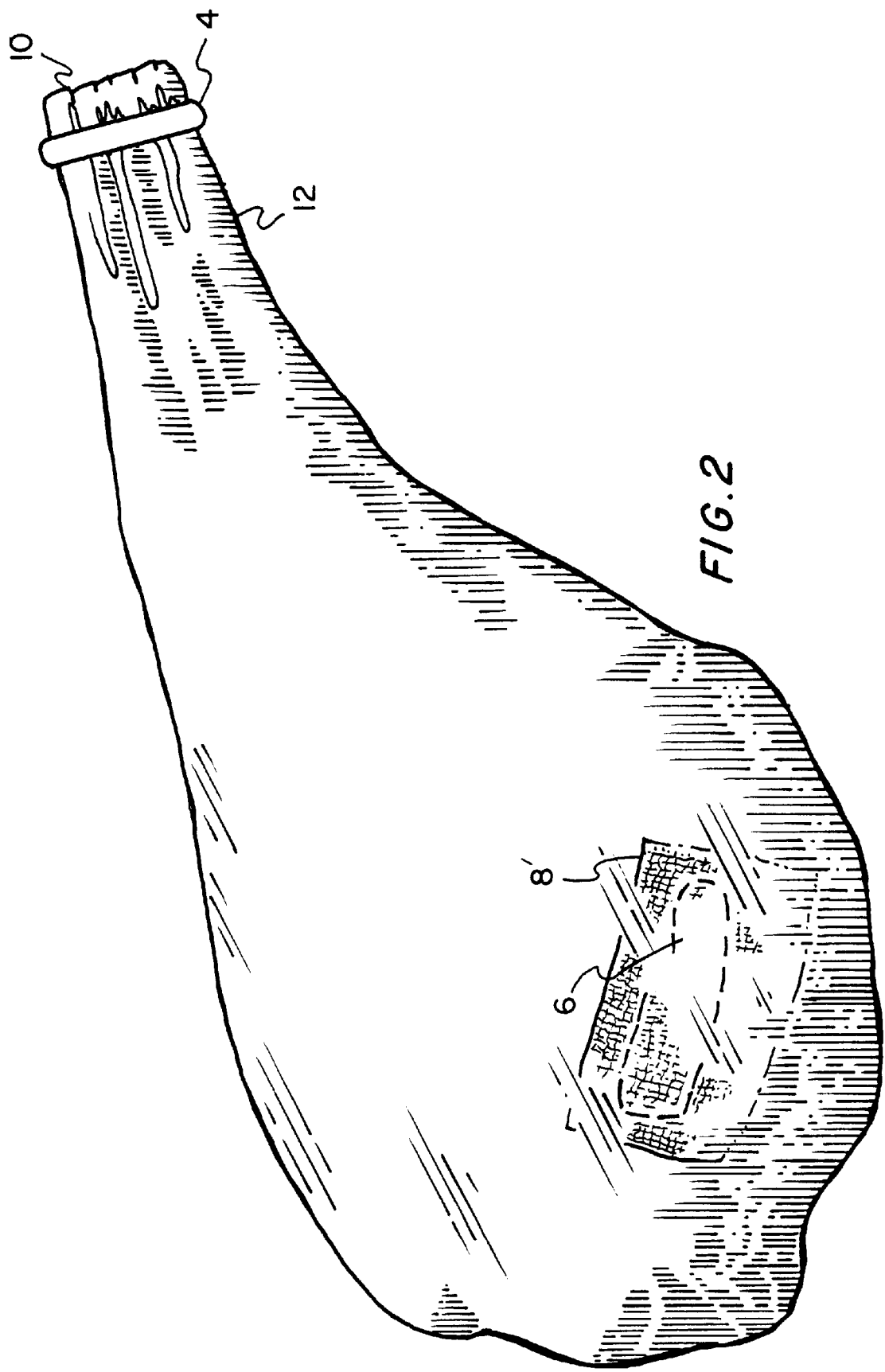

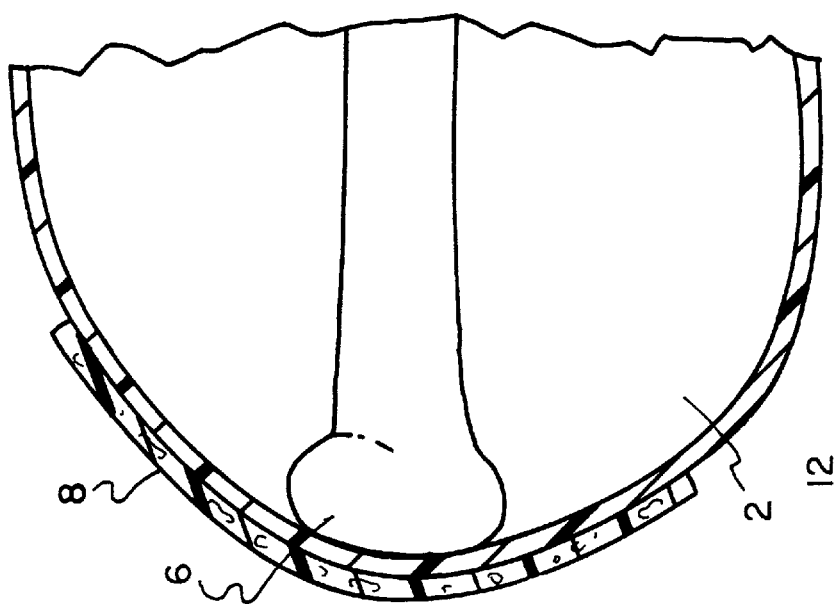

PROTECTIVE FOAMED PATCH FOR SHRINKABLE BAG

This application is a continuation of application Ser. No. 07/694,710 filed on May 2, 1991, now abandoned.

FIELD OF THE INVENTION

This invention relates to the packaging of bone-in cuts of meat. In particular, this invention relates to a protective foamed patch which prevents or reduces the likelihood that a bone will completely puncture and rupture a thermoplastic vacuum bag and patch combination.

BACKGROUND OF THE INVENTION

The use of heat shrinkable thermoplastic films as flexible packaging materials for vacuum packaging various foodstuffs including a meat is well-known. Such plastic materials, rials, however, while in general quite successful for packaging meat understandably have difficulties in successfully packaging sharp or bony products. For example, attempts to package bone-in primal cuts of meat usually result in an unsatisfactorily large number of bag failures due to bone punctures. The use of cushioning materials such as paper, paper laminates, wax impregnated cloth, and various types of plastic inserts have proved to be less than totally satisfactory in solving the problem. The preperation of special cuts of meat or close bone trim with removal of offending bones has also been attempted. However, this is at best only a limited solution to the problem since it does not offer the positive protection necessary for a wide variety of commercial bone-in types of meat. Furthermore, removal of the bone is a relatively expensive and time consuming procedure.

Accordingly, it is one object of the present invention to provide a patch material and method for making the patch which will minimize and eliminate the puncturing of flexible, heat shrinkable vacuum bags by sharp bones.

An example of a prior art method of protecting a thermoplastic bag from puncture is shown in U.S. Pat. No. 2,891,870 which issued on Jun. 23, 1959 to Meyer S. Selby et al. In the Selby patent the exposed bone in a bone-in cut of meat is covered with a wax impregnated cloth and thus protected meat is placed in a heat shrinkable plastic bag. Accordingly, it is another object of the present invention to eliminate the necessity for having a separate packaging item such as a wax impregnated cloth which must be carefully positioned over the bone and to provide a protective patch which will not be as sensitive to or dependent upon the position of the bone within a vacuum bag.

Other patents involving a patch for a shrinkable bag are U.S. Pat. Nos. 4,755,403; 4,765,857; and 4,770,731, all to Ferguson. Australian Patent Publication 11228/88, published Aug. 4, 1988, to Mack, Lustig, and Vicik involves a heat-shrinkable plastic film which is a blend of certain amounts of ethylene-vinyl acetate, linear very low density polyethylene, and linear low density polyethylene. This film is used as a guard patch and annealed to a saran barrier bag such as that disclosed in Canadian Patent 982,923, issued Feb. 3, 1976 to Lustig and Anthony. In the United States, saran has lost its trademark status and become generic. It refers to copolymers of vinylidene chloride and a comonomer therefor, such as acrylonitrile, vinyl chloride, or methyl acrylate. It is well known as a barrier to the passage of oxygen. Moreover, a cross-oriented patch material is disclosed in U.S. Pat. No. 4,534,984 to Kuehne. General background information can be found in U.S. Pat. Nos. 4,547,427 and 4,601,930, both Engelsberger, U.S. Pat. No. 4,542,075, Schirmer, Assignor to Grace, and also in U.S. Pat. No. 4,971,845, issued Nov. 20, 1990, Asker and Stroud, assignors to Star Corporation.

Another object of the present invention is to provide a patch for a thermoplastic vacuum bag which is relatively strong and tough and which can be readily adhered to the outer surface of a thermoplastic vacuum bag.

An advantage with the instant invention is that the foamed patch increases the apparent thickness of the patch, vis-a-vis a patch such as that in U.S. Pat. No. 4,755,403, with minimal cost increase since foaming decreases the density of the patch. Moreover, the foamed patch should absorb more energy during impact.

Percentages recited herein are percentages by weight.

These and other objects of the present invention will be more readily understood from the summary of the invention, the drawings, and the description of the preferred embodiment which follow:

SUMMARY OF THE INVENTION

Therefore, the present invention provides a protective multi-layer patch suitable for use with a biaxially heat-shrinkable bag, said patch comprising: (a) a first outer polymeric layer; (b) an inner foamed polymeric layer; and (c) a second outer polymeric layer. Also, the present invention provides the patch wherein at least one of (a) or (c) comprises a blend of a major amount of 50% or more by weight of linear low density polyethylene and a minor amount of less than 50% by weight of ethylene vinyl acetate copolymer, wherein said ethylene vinyl acetate copolymer has a vinyl acetate content in the range from 7% to 12% by weight, and wherein (b) comprises an ethylene vinyl acetate copolymer having 20% to 35% vinyl acetate content by weight.

DESCRIPTION OF THE DRAWINGS

In the drawings, which are appended hereto and made a part of this disclosure:

FIG. 2 is a perspective view similar to that in FIG. 1, but showing meat with a prior art patch in position;

FIG. 3 is a sectional view taken along lines 3—3 of FIG. 1;

FIG. 5 is a sectional view along lines 5—5 of FIG. 4; and

DETAILED DESCRIPTION

Figure 1:
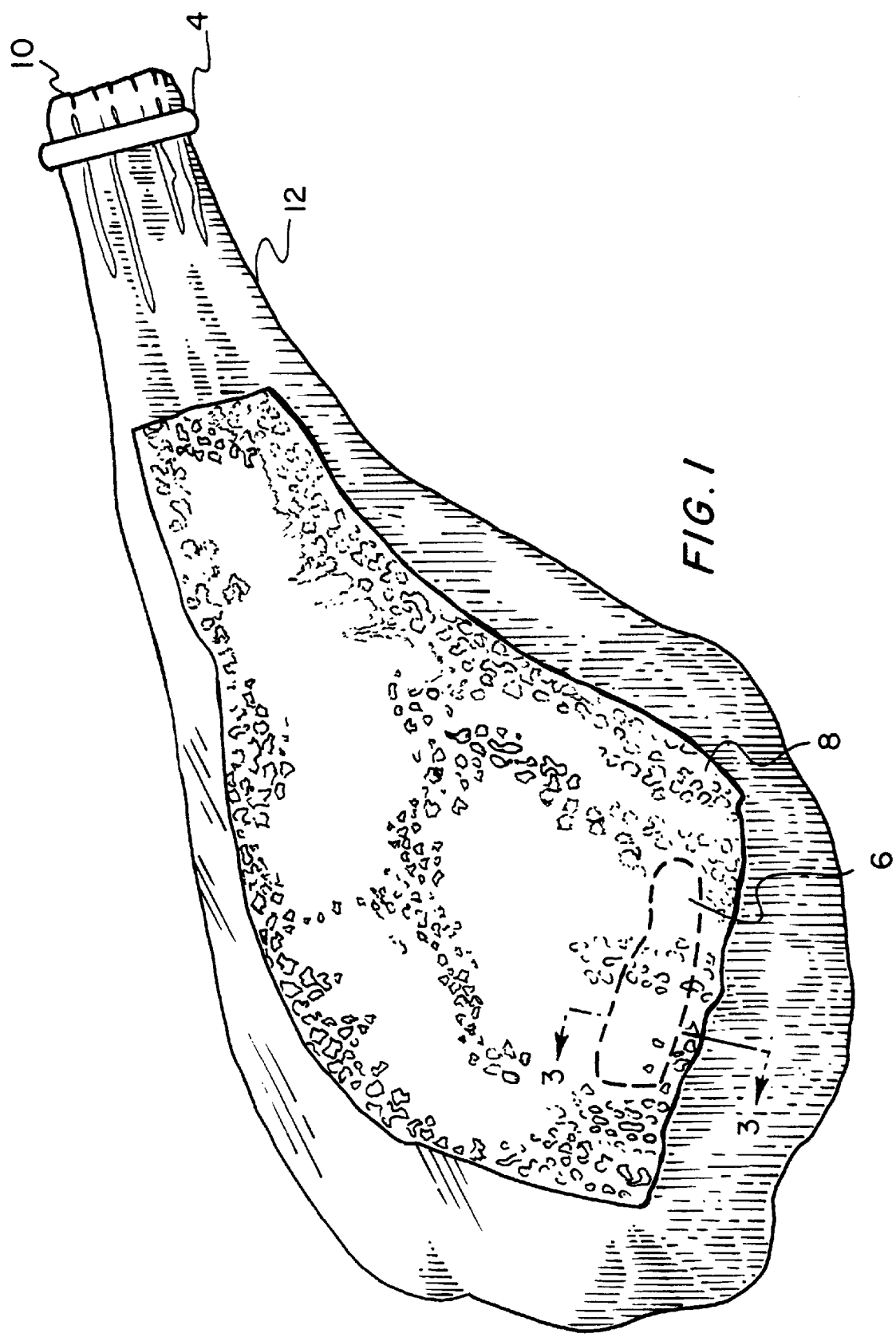
FIG. 1 is a perspective view of meat enclosed in a heat shrunk bag with the patch of the present invention on the exterior thereof.

Referring more specifically to the drawings and to FIGS. 1–6, there is provided a bone-in cut of meat 2, for example, a leg of lamb, having exposed bone portion 6. There is also provided patch 8 on biaxially heat-shrinkable bag 12 covering a substantial portion of the visible side of the package. Having the patch on the outside of the bag facilitates the step of loading the bag by eliminating the concern over dislodging a manually laid on cloth patch or a patch adhered to the inside of the bag. Loading can, therefore, take place more readily and easily. After a bone-in cut is loaded into the bag air is evacuated from the package and the bag neck 10 is gathered having the appearance as shown in FIG. 1 and thereafter a clip 4 is applied to securely seal the bag. The bag can then be immersed in hot water and shrunken tightly against the meat thus providing a meat product in an evacuated atmosphere for aging and preservation. The biaxially heat-shrinkable patch 8 shrinks with the bag thus reducing the tendency to delaminate when the patch is not shrinkable as the bag.

FIG. 2 shows a bag 12 and prior art covering cloth patch 8' which requires careful positioning of the cloth 8' over the bone 6 and also requires care in positioning the bone within the bag so that the cloth 8' is not pushed out of position or dislodged. This is like that in U.S. Pat. No. 2,891,870, Selby et al, mentioned above.

FIG. 3 shows in cross section the exposed bone portion 6 covered by bag 12 with a preferred patch 8 adhered to the outside of the bag over the bone protrusion.

Figure 4:
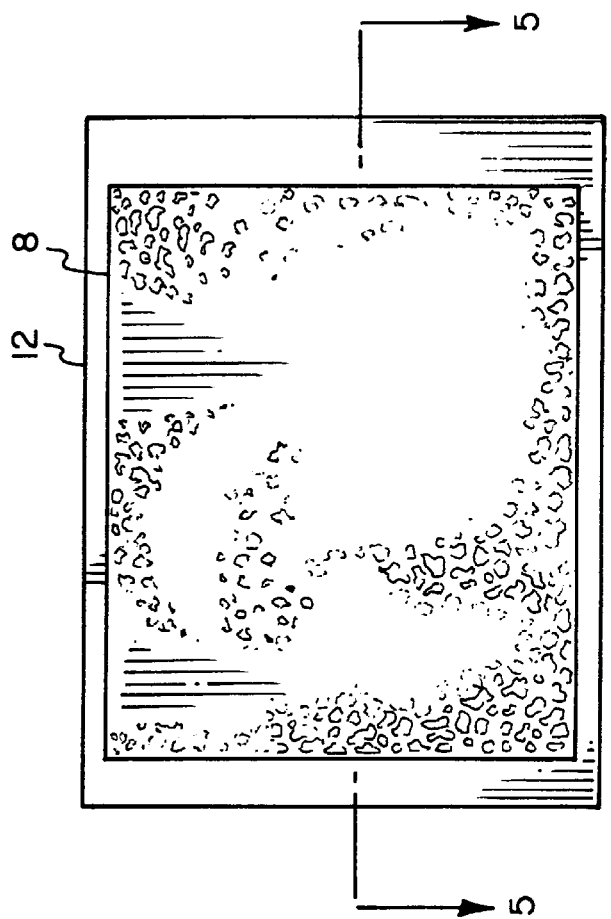
FIG. 4 is a fragmentary view showing the patch of the present invention adhered to a thermoplastic vacuum bag.

In FIG. 4 patch 8 is shown adhered to one side of a wall of bag 12. Preferably patch 8 will cover substantially one side of a bag in its flattened, lay-flat position. In many applications it is desirable to adhere a patch to both sides of a bag.

FIG. 5 is a cross-section view of FIG. 4 showing patch 8 adhered to the one wall of bag 12.

Figure 6:
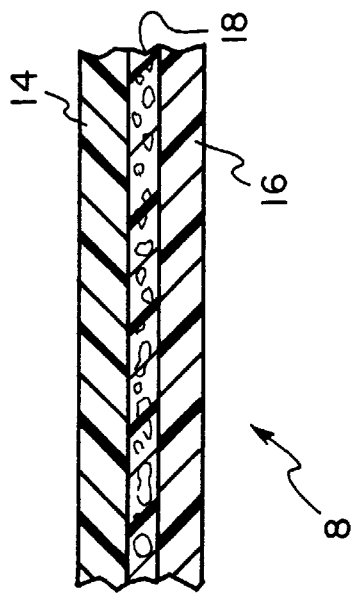
FIG. 6 is an exaggerated sectional view of the patch material of the present invention showing a preferred arrangement of the layers.

FIG. 6 shows a cross-section, in an exaggerated form, of 3-layer patch 8 with outer layers 14 and 16 and foamed inner layer 18. In a preferred embodiment the composition of outer layers 14 and 16 comprises linear low density polyethylene (hereinafter LLDPE) and ethylene-vinyl acetate (hereinafter EVA) copolymer. The preferred linear low density polyethylene is Dowlex 2045, having a density of 0.920 and a melt index of 1.1, from Dow Chemical Company of Midland, Mich. and the preferred ethylene-vinyl acetate copolymer is ELVAX 3128 from the duPont Company of Wilmington, Del. ELVAX 3128 has 9% VA and a melt index of 2. The inner layer 18 comprises ethylene-vinyl acetate copolymer having 6% VA, which has been foamed. The patch material may be made by coextruding a 3-layer tube where a foaming agent has been added to the pellets for layer 18. The foaming agent may be water, sodium bicarbonate+citric acid, pentene, carbon dioxide, and the like.

Figure 7:
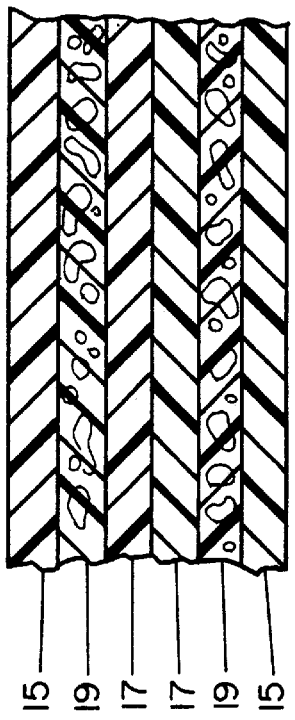
FIG. 7 is another exaggerated sectional view of the patch material of the present invention, but with this emobodiment showing another preferred arrangement of six layers made by self welding a three layer tube.

Alternatively, shown in FIG. 7 of the drawings, in another preferred embodiment, the patch 9 was of six layers made by coextruding a 3-layer tube of the structure: layer 15/layer 19/layer 17, where 17 happened to be the inside of the tube, and then collapsing the tube upon itself so that the layer that was the inside of the tube adhered or welded to itself resulting in a six layer patch of the structure: layer 15/layer 19/layer 17/layer 17/layer 19/layer 15. In this instance, the patch would provide even greater protection since it had two foamed layers and a total of six layers. Also, in this instance since the inside of the tube was self-welded as the patch was in the lab example in U.S. Pat. No. 4,755,403, layer 17 comprised an adhesive-type ethylene-vinyl acetate copolymer having 28% vinyl acetate from the U.S.I. Division of National Distillers of New York, N.Y. Layer 18 was EVA (6% VA) foamed with water. Layer 14 was by weight 87% LLDPE and 10% EVA (9% VA), and 3% color materbatch. The color was a cream color purchased as EPE 10211A from Teknor Color. All layers were cross-linked by irradiation to the dosage level which is equivalent to 7 MR. Again, another six layer patch was made of the structure: layer 15/layer 19/layer 17/layer 17/layer 19/layer 15, except the two layers 15 were 97% polyethylene terephthalate and 3% cream color.

Also, an alternative patch material was made by coextruding a 3-layer biaxially heat-shrinkable tube of the structure: 87% LLDPE+3% cream color concentrate+10% EVA (9% VA)/foamed 77.5% VLDPE+15% adhesive+7.5% foaming agent/100% EVA (28% VA). The EVA (9% VA) was ELVAX 3128 from dupont. The LLDPE was Dowlex 2045 from Dow, with a density of 0.920 and a melt index of 1.1. The cream color was EPE9621C from Teknor Color. The foaming agent was 10104 BA which is sold by Ampacet. The VLDPE was Attane 4203 from Dow, with a density of 0.905 and a melt index of 0.80. The adhesive was CXA3101 from Bynel. The EVA (28% VA) was ELVAX 3175 from dupont.

A typical size for the protective material of the present invention would be 17.5 inches (43.2 cm) wide, and anywhere from 10 inches (25.4 cm) to 18 inches (45.7 cm) long, as the typical lay-flat dimensions of the saran barrier bag to which the patch would be adhered is 18 inches (45.7 cm) wide by 30 inches (76.2 cm) long. Typically larger bags are used for blades of meat, and these bags are 22 inches (55.9 cm) by 34 inches (86.4 cm) and accordingly a larger patch would be used.

The patch may be adhered to the bag as shown in U.S. Pat. No. 4,755,403 (Ferguson) or AU Publication 11228/88 (Mack, Lustig, and Vicik), both mentioned above, the disclosures of both of which are incorporated herein by reference.

The embodiments as described above are preferred ones but a satisfactory patch can be made where the outer layers 14 and 16 comprise 15% ethylene-vinyl acetate copolymer having 9% vinyl acetate and 83.3% linear low density polyethylene with the balance of 1.7% being a pigment. In addition, satisfactory patches can be made with the outer layers comprising a blend of 90% linear low density polyethylene with 10% ethylene-vinyl acetate copolymer. It is believed that the desirable composition range for the outer layer is 80% to 100% linear low density polyethylene and 20% to 0% ethylene-vinyl acetate copolymer with the vinyl acetate content having a range from 7% to 12% vinyl acetate and optionally the outer layer may have 0 to 3% pigment. The inner foamed layer preferably comprises an ethylene-vinyl acetate copolymer having 20 to 35% vinyl acetate content.

The copolymers referred to as linear low density polyethylene (LLDPE) generally have a density of 0.900 to 0.935 grams per cubic centimeter and a crystalline melting point in the range of 110° C. to 125° C. When the density is very low, usually below 0.910 or 0.915, then the LLDPE is typically referred to as VLDPE, very low density linear polyethylene. These linear low density polyethylenes are not homopolymers although they are referred to generally as "polyethylene". In fact, they are copolymers of ethylene and an alpha-olefin having a carbon number less than 18, for instance, butene-1, pentene-1, hexene-1, octene-1, etc. In the Dowlex brand of linear low density polyethylene used in the above preferred embodiment it is understood that the alpha-olefin is octene-1. Examples of patents showing the use of such polymers are U.S. Pat. No. 4,425,268 which issued on Jan. 8, 1984 to Barry A. Cooper; U.S. Pat. No. 4,456,646 which issued on Jun. 26, 1984 to Nishimoto et al; U.S. Pat. No. 4,399,180 which issued on Aug. 16, 1983 to William F. Briggs et al; U.S. Pat. No. 4,457,960 which issued on Jul. 3, 1984 to David L. Newsome; U.S. Pat. Nos. 4,863,769 and 4,976,898, both to Lustig et al.; and U.S. Pat. No. 4,640,856 to Ferguson.

Typical vacuum bags and the vacuum bag of the type used in the test and example set forth above are made according to the process shown in U.S. Pat. No. 3,741,253 which issued on Jun. 26, 1973 to Harri J. Brax et al. The vacuum bags could also be made by U.S. Pat. No. 4,112,181 to Baird. The method of the Brax et al patent and the method of the Baird patent are incorporated herein by reference and provide background for the description which follows for the method of making the patch of the present invention.

As used herein the term "extrusion" or the term "extruding" is intended to include coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C.), will have a free shrink of about 5% or greater in at least one linear direction.

To make the patch of the present invention, ethylenevinyl acetate copolymer and a foaming agent is sent to a first extruder. This material forms layer 18 (FIG. 6). Also, a blend having a blend of ethylene-vinyl acetate copolymer and linear low density polyethylene, is fed into a second extruder. This material forms layers 14 and 16. Both extruders feed a common coextrusion die of the type which is well-known in the art. The extrudate which issues from the die has an inner layer of the foamed ethylene-vinyl acetate copolymer and two outer layers of the blend. This type of coextrusion essentially coextrudes three concentric tubes, one inside the other.

As the tube is extruded downwardly it is closed off and flattened by pinch rollers. The tube wall is about 17 to 17.5 mils thick. This flattened tubing may then be fed through an irradiation vault where it will preferably receive a dosage of approximately 7 MR to cross-link the polymeric materials which comprise the tube. The preferred range is 4.5 MR to 13 MR with the most suitable range being between 6 and 8 MR. Chemical cross-linking using an organic peroxide is thought to be an alternative cross-linking method but quite satisfactory results are obtained through use of irradiation cross-linking and irradiation cross-linking is preferred. After receiving the cross-linking dosage the tube is opened, inflated, heated, and stretched by the well-known trapped bubble technique which is described in the above mentioned Brax et al patent. The biaxially stretching orients the tube material. After the material has been stretched to the desired diameter and wall thickness, it is then rapidly cooled and collapsed. The tube wall is now about 5 to 5.5 mils thick. This process results in a biaxially oriented patch material which is heat shrinkable at approximately the temperature at which it was oriented. Thus, a multi-layer tubular material is produced, in this instance, a 3 layer material as shown in FIG. 6 is produced. This material can be cut into patches and adhered to one or both sides of the heat shrinkable bag to produce a protective material which will greatly diminish the occurrence of bone punctures.

Many suitable adhesives to adhere the patch to the bag are available and can readily be selected by those skilled in the art. Alternatively, the patch may be annealed to the bag, as described in AU Published Application 11228/88, mentioned above.

While certain representative embodiments and details have been shown for the purpose of illustration, numerous modifications to the formulations described above can be made without departing from the invention disclosed.

I claim:

1. A protective multi-layer biaxially heat-shrinkable patch in combination with a biaxially heat shrinkable bag, said patch comprising:

(a) a first outer non-foamed polymeric layer, (b) an inner foamed polymeric layer, and (c) a second outer non-foamed polymeric layer wherein the patch is adhered on the outside of the biaxially heat shrinkable bag.

2. The bag and patch of claim 1, wherein the patch material has been cross-linked by irradiation to the equivalent of a dosage level in the range between 4.5 to 13 MR.

3. The bag and patch of claim 1, wherein the patch comprises six layers.

4. The bag and patch of claim 1, wherein layer (c) comprises an adhesive polymer and the patch has been self-welded to form the structure: a/b/c/c/b/a.

5. The bag and patch of claim 1, wherein the material of layers (a) and (c) comprise 80 to 100% by weight linear low density polyethylene blended with 0 to 20% by weight ethylene-vinyl acetate copolymer having 7 to 12% by weight vinyl acetate content and with 0 to 3% by weight pigments and additives, and layer (b) comprises a foamed ethylene-vinyl acetate copolymer.

6. The bag and patch according to claim 1, wherein (I) said outer layers of the patch comprise a blend of:
linear low density polyethylene, and
ethylene-vinyl acetate copolymer, and (II) the foamed inner layer comprises ethylene-vinyl acetate copolymer.

7. The bag and patch of claim 1, wherein at least one of layer (a) or layer (c) comprises a blend of a major amount of 50% or more by weight of linear low density polyethylene and a minor amount of less than 50% by weight of ethylene vinyl acetate copolymer, wherein said ethylene vinyl acetate has a vinyl acetate content in the range from 7% to 12% by weight, and wherein layer (b) comprises an ethylene vinyl acetate copolymer that has a vinyl acetate content in the range from 20% to 35% by weight.

* * * * *